United States Patent

Rockford et al.

[11] Patent Number: 5,892,943
[45] Date of Patent: Apr. 6, 1999

[54] SHARED BIOS ROM WARM BOOT

[75] Inventors: J. Glen Rockford, Wading River, N.Y.; Jeffrey C. Dunnihoo, Austin, Tex.; Richard E. Wahler, Lake Ronkonkoma, N.Y.

[73] Assignee: Standard Microsystems Corp., Hauppauge, N.Y.

[21] Appl. No.: 774,626

[22] Filed: Dec. 30, 1996

[51] Int. Cl.[6] ........................................ G06F 9/06
[52] U.S. Cl. ............................... 395/652; 395/830
[58] Field of Search ................... 395/651, 652, 395/653, 200.5, 200.51, 200.52, 828, 830, 833, 834

[56] References Cited

U.S. PATENT DOCUMENTS

| | | | |
|---|---|---|---|
| 5,022,077 | 6/1991 | Bealkowski et al. | 380/4 |
| 5,410,707 | 4/1995 | Bell | 395/652 |
| 5,603,055 | 2/1997 | Evoy et al. | 395/652 |
| 5,701,477 | 12/1997 | Chejlava, Jr. | 395/652 |

*Primary Examiner*—Kevin A. Kriess
*Attorney, Agent, or Firm*—Hopgood, Calimafde, Kalil & Judlowe, LLP

[57] ABSTRACT

An interface that allows the host CPU and the keyboard controller in a PC to share a common BIOS ROM includes a logic circuit that receives a set of input signals and produces a set of signals that emulates a jump instruction op-code that causes the host CPU to vector to a specified address location in the system memory map normally reserved for the system ROM BIOS code, whenever both the host CPU and keyboard controller are contending for access to the BIOS ROM.

5 Claims, 3 Drawing Sheets

SHARED BIOS ROM WARM BOOT

This invention relates generally to personal computers (PCs), and more particularly to an interface that permits the system BIOS and keyboard BIOS to be consolidated into a single ROM.

BACKGROUND OF THE INVENTION

The standard personal computer, whether of the desktop, laptop or notebook type, includes a central processor (CPU), typically a microprocessor, such as the Intel Pentium or 486, and a keyboard controller. The computer's basic, or lowest-level, instruction set, is commonly known as the Basic Input Output System (BIOS). The BIOS, which normally comprises the basic input and output routines needed for communicating between software and hardware, is typically stored in read-only memory (ROM).

A microcontroller embedded in the keyboard is responsible to scan, debounce, interpret keystrokes and communicate with a keyboard controller mounted on the PC's main circuit board or motherboard. The keyboard controller has its own ROM from which it executes its code, commonly referred to as the keyboard BIOS. The conventional IBM-compatible PC employs two separate BIOS ROMs; one, the system BIOS ROM, contains the system BIOS instruction code and the other, the keyboard BIOS ROM, contains the keyboard BIOS instruction code.

In recent years, there has been an increased integration of additional features, capabilities and functionality on a single integrated circuit. This trend toward greater integration, which has resulted in increased power at lower cost in commercial PCs, has created an interest and a desire among PC designers to integrate both the system and keyboard BIOS in a single, unified ROM on a single chip. There has thus been an ongoing effort among PC designers to develop an interface that would allow the use of a shared BIOS ROM for access by both the host CPU and keyboard controller. Previous attempts to implement such an interface have, however, been only of limited success at least in part because of the inability of prior interface designs to make the BIOS ROM always available for the device (keyboard or host CPU) that needs to execute out of the BIOS ROM at any given time.

This problem arises from the fact that in the conventional PC, once the System Reset or CPU Reset signal has transitioned from an asserted state to a deasserted state, the host CPU will effectively begin fetching code located in BIOS ROM from its initialization address. The assertion of the CPU Reset signal may therefore occur without first informing the device that controls the shared ROM interface. If the CPU Reset signal is asserted at any time that the host CPU does not have ownership of, or access to, the ROM interface, then, following deassertion of the CPU Reset signal, the host CPU in attempting to read code from its initialization vector (mapped to the ROM space), will read incorrect data ("garbage") resulting in system misoperation and a likely system crash.

The most common and straightforward way to solve this problem would be to include dual-ported interface circuitry to arbitrate simultaneous accesses to the BIOS ROM between the host CPU and the keyboard controller. This approach, however, has several disadvantages. For example, any time the host CPU accesses the ROM it steals cycles from the keyboard controller. This is undesirable, particularly if the keyboard controller is at the time executing code that is time-dependent or critical. In addition, intersplicing the host CPU access with keyboard controller access to the BIOS ROM requires careful attention to the current state of the keyboard controller's bus cycle so that it is interrupted only on instruction boundaries, i.e., not in the middle of a Read strobe. This requires that the appropriate control signal be deasserted and held until the keyboard controller can be stopped, which typically results in an approximately two to three microseconds additional delay per access by the host CPU. A dual-ported interface that would perform this function would add a significant level of complexity and require additional cost to implement. It also may result in performance degradation for both the host CPU and the keyboard controller.

SUMMARY OF THE INVENTION

It is an object of the present invention to provide a low-cost and relatively simple interface in a PC that allows the host CPU and keyboard processor to reliably share a common, unitary BIOS ROM.

It is a further object of the present invention to allow the keyboard BIOS and system BIOS in a PC to share a common ROM by the use of a relatively simple, low-cost interface.

The interface of the present invention allows either the host CPU or the keyboard controller to have access to a shared BIOS ROM at any given time; that is, it provides for the situation in which both the host CPU and keyboard controller both seek access to the BIOS ROM at the same time. The interface of the invention, however, does not allow simultaneous dual-ported access to the BIOS ROM by the host CPU and keyboard controller.

In one embodiment of the invention, the ROM interface is owned by, or is accessible by, the host CPU whenever the System Reset signal is deasserted and the embedded keyboard controller is disabled. Under all other combinations of System Reset and keyboard controller status, the ROM interface is owned or controlled exclusively by the keyboard controller. During normal system boot operation, the keyboard controller is disabled prior to System Reset being deasserted, which allows the host CPU to access the shared BIOS ROM during system initialization.

Under normal system operation, when the System Reset signal is deasserted and the keyboard controller is enabled, the BIOS ROM can be accessed by, that is, it belongs exclusively to the keyboard controller. Under these conditions, a CPU Reset could be issued by the system's core logic, which would reset the host CPU. When the host CPU is thus reset it will automatically perform a jump to its initialization vector address and will attempt to fetch code from the BIOS ROM. When the host CPU tries to access the BIOS ROM under this condition, the logic circuitry of the interface of the invention emulates a set of op-codes that produces an instruction for the host CPU to jump to an address location in the PC's memory map which contains a shadow or replication of the system ROM BIOS. The host CPU will then execute normally from the shadowed ROM BIOS.

To the accomplishment of the above and to such further objects as may hereinafter appear, the present invention relates to a shared BIOS ROM interface, substantially as defined in the appended claims and as described in the following detailed specification, considered along with the attached drawings, in which:

DETAILED DESCRIPTION OF PREFERRED EMBODIMENTS

Figure 1:
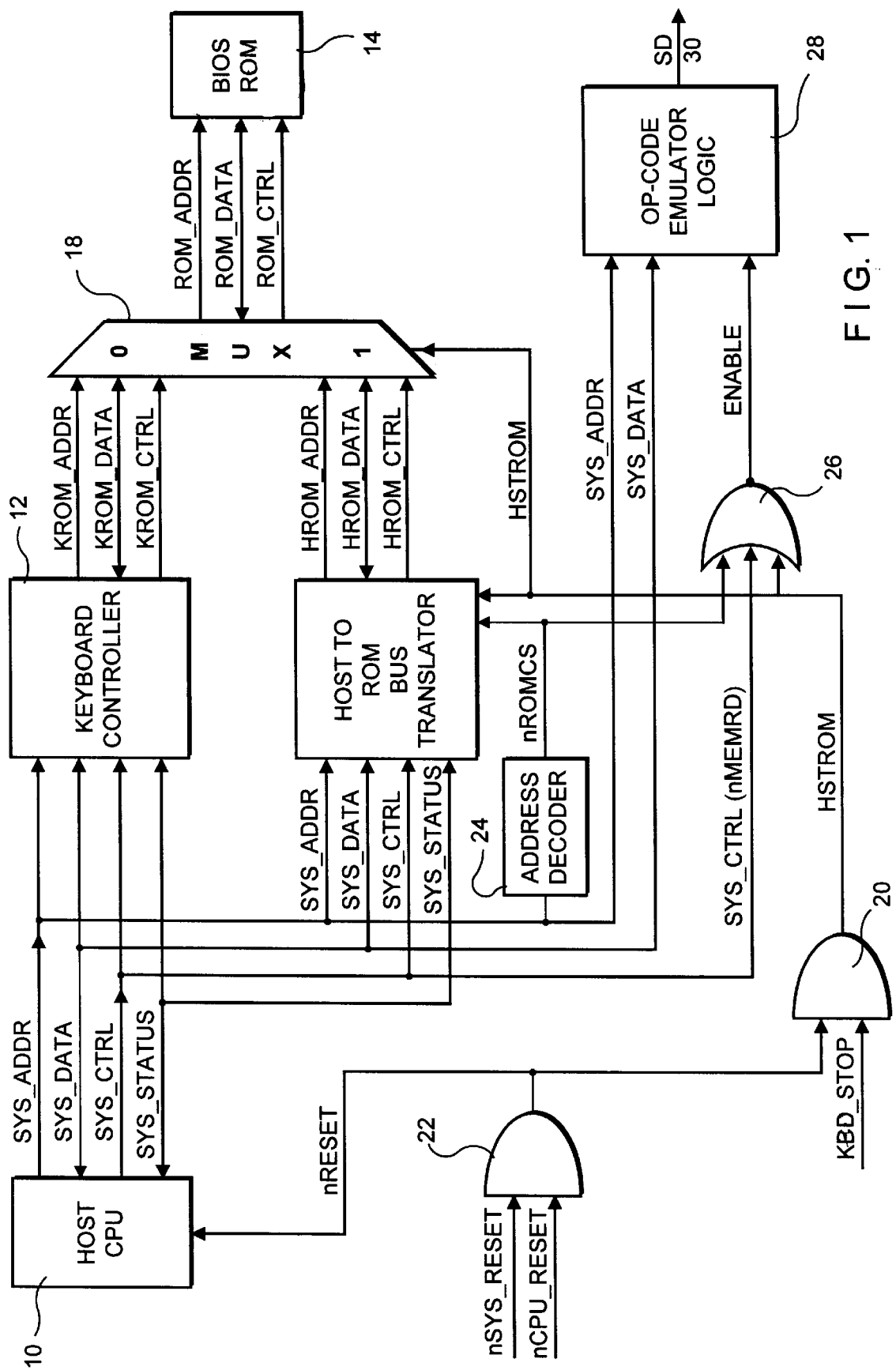
FIG. 1 is a schematic block diagram of the shared BIOS ROM interface of the present invention installed in a PC.

The BIOS ROM interface of the invention is, as illustrated in FIG. 1, connected with a host CPU 10, a keyboard controller 12, and a shared BIOS ROM 14. The latter may be in the form of 256K×8 FLASH memory. The BIOS ROM interface includes all logic blocks illustrated in FIG. 1, other than CPU 10, keyboard controller 12, and BIOS ROM 14. The BIOS ROM interface of the invention mediates access between the host CPU 10 and the keyboard controller 12 to the BIOS ROM 14 in those cases in which both seek access to the BIOS ROM at the same time. In accordance with the invention, when both the host CPU and the keyboard controller seek access to the BIOS ROM, the host CPU is caused to access a predetermined BIOS ROM code location in the system memory map.

As is otherwise conventional, the host CPU 10 produces a set of system address signals SYS_ADDR, and a set of system control signals SYS_CTRL to the keyboard controller 12. A set of system data signals SYS_DATA is applied bidirectionally between the host CPU 10 and keyboard controller 12. The host CPU 10 receives system status signals SYS_STAT from a host to ROM translator 16. Controller 12 also receives a keyboard stop signal KBD_STOP.

Translator 16 receives at its inputs the SYS_ADDR, SYS_DATA and SYS_CTRL signals from the host CPU 10, and converts or translates them at its output, in a known manner, to, respectively, host ROM address signals HROM_ADDR, host ROM data signals HROM_ATA, and host ROM control signals HROM CTRL. These three sets of signals are applied to one section of a multiplexer 18, which also receives keyboard controller ROM address signals; KROM ADDR, keyboard controller ROM data signals KROM_DATA, and keyboard controller ROM control signals KROM_TRL from the keyboard controller 12. Multiplexer 18 receives as its control signal the host ROM signal HSTROM which is discussed in more detail below. As shown in FIG. 1, HSTROM is derived at the output of an AND gate 20, which receives at its inputs the KBD_STOP signal from the host CPU 10 and the inverse of the RESET signal which is also applied to the reset terminal of the host CPU 10. The RESET signal appears at the output of an AND gate 22, the inputs to which are the inverse System Reset and CPU reset signals, nSYS_RESET and nCPU_RESET.

The SYS_ADDR signals are also applied to an address decoder 24 which decodes the address signals and derives at its output the BIOS ROM control signal nROMCS. That signal is applied to a control input of host to ROM bus translator 16, as well as to one input of a NOR gate 26. The other inputs to gate 26 are a SYS CTRL signal (the inverse memory read signal nMEMRD) and HSTROM. The latter is also applied to the control input of multiplexer 18 to determine whether the keyboard or host CPU address, data and control signals are passed through the multiplexer to the BIOS ROM as the ROM ADDR, ROM DATA, and ROM CONTL signals. As described in greater detail below, with reference to FIG. 2, the output of gate 26 when high is an enable signal which enables an op-code emulator logic circuit 28. The output of logic circuit 28, system data bus 30 is an emulated BIOS ROM data signal, which is generated by circuit 28 when both the host CPU and keyboard controller are seeking access to the shared BIOS ROM at the same time.

That is, when HSRTOM=1 the host CPU 10 can access the contents of the BIOS ROM 14 through the translator 16 and multiplexer 28. The multiplexer 18 is set by HSTROM to connect the CPU output of the translator 16 to the BIOS ROM 14. HSTROM=1 signifies that the keyboard controller is not running (KBD-STOP=1) and that its ROM interface signals are disconnected from the BIOS ROM by means of the multiplexer 18. Additionally, when HSTROM=1, the op-code emulator logic circuit is disabled since ENABLE is driven low. As shown in Table 1 below, and observed in the logic of FIG. 1, the only condition under which HSTROM=1 is when the keyboard controller is not running (KBD STOP= 1) and the host CPU is not held in reset (RESET=0), or nRESET=1.

When HSTROM=0, the multiplexer 18 is switched so that the keyboard controller outputs are connected through the multiplexer to the BIOS ROM 14, whether the keyboard is running or not. In this event, the outputs of the translator 16 are disconnected from the BIOS ROM so that READ accesses by the host CPU to the BIOS ROM enable the op-code emulation logic 28, that is, when HSTROM, nROMCS and nMEMRD are all low so that the output of NOR gate 26 is high.

As described in greater detail below, emulation logic circuit 28 produces, when enabled in this manner, op-code data bytes onto the host data bus 30 that provide the host CPU with up to 8 addressable valid instructions (op-codes). Only the lower three address lines are decoded as the emulation logic circuit 28 only needs to provide an absolute jump instruction to shadow RAM in system memory, which can usually be done with five 8-bit op codes.

During normal system boot operation, the keyboard controller is disabled (KBD_STOP=1) before System Reset is deasserted (nSYS_RESET=1). This caused HSTROM=1 allowing the host CPU to access the BIOS ROM during system initialization. In addition, the host CPU has access to the KBD_STOP bit used to enable/disable the embedded keyboard controller while System Reset is deasserted. By setting this bit, the host CPU can disable the keyboard controller and gain access to the BIOS ROM whenever it is needed. This operation of the ROM interface is summarized in Table 1.

TABLE 1

HSTROM Logic Table

| System Reset | Keyboard Controller | HSTROM bit | ROM Interface Owned By |
|---|---|---|---|
| asserted (nRESET = 0) | enabled (KBD_STOP = 0) | 0 | Keyboard Controller |
| asserted (nRESET = 0) | disabled (KBD_STOP = 1) | 0 | Keyboard Controller |
| de-asserted (nRESET = 1) | enabled (KBD_STOP = 0) | 0 | Keyboard Controller |
| de-asserted (nRESET = 1) | disabled (KBD_STOP = 1) | 1 | Host CPU |

Most of the time the system will be operating with System Reset deasserted (nRESET=1) and the keyboard controller enabled ((KBD_STOP=0). Under these conditions, as indicated in Table 1, the signal HSTROM is binary 0, and the ROM interface, as indicated in Table 1, belongs to the keyboard controller. Under these conditions a CPU Reset could be issued by the system's core logic, thereby resetting the host CPU. When the host CPU is reset it will perform a jump to its initialization vector address and will attempt to fetch code from the BIOS ROM. Since the CPU Reset is an asynchronous event, the ROM interface is still owned by the keyboard controller and is not switched for access by the host CPU. In this case, when the host CPU tries to access the BIOS ROM emulator, logic circuitry 28, such as that shown in FIG. 2, derives the lower 8 bits of the System Data bus signal SD[7:0] so as to emulate a set of op codes that will result in an automatic jump by the host CPU to an address in the system memory map that stores a replicated BIOS code. This area is known in the industry as shadow RAM.

Figure 2:
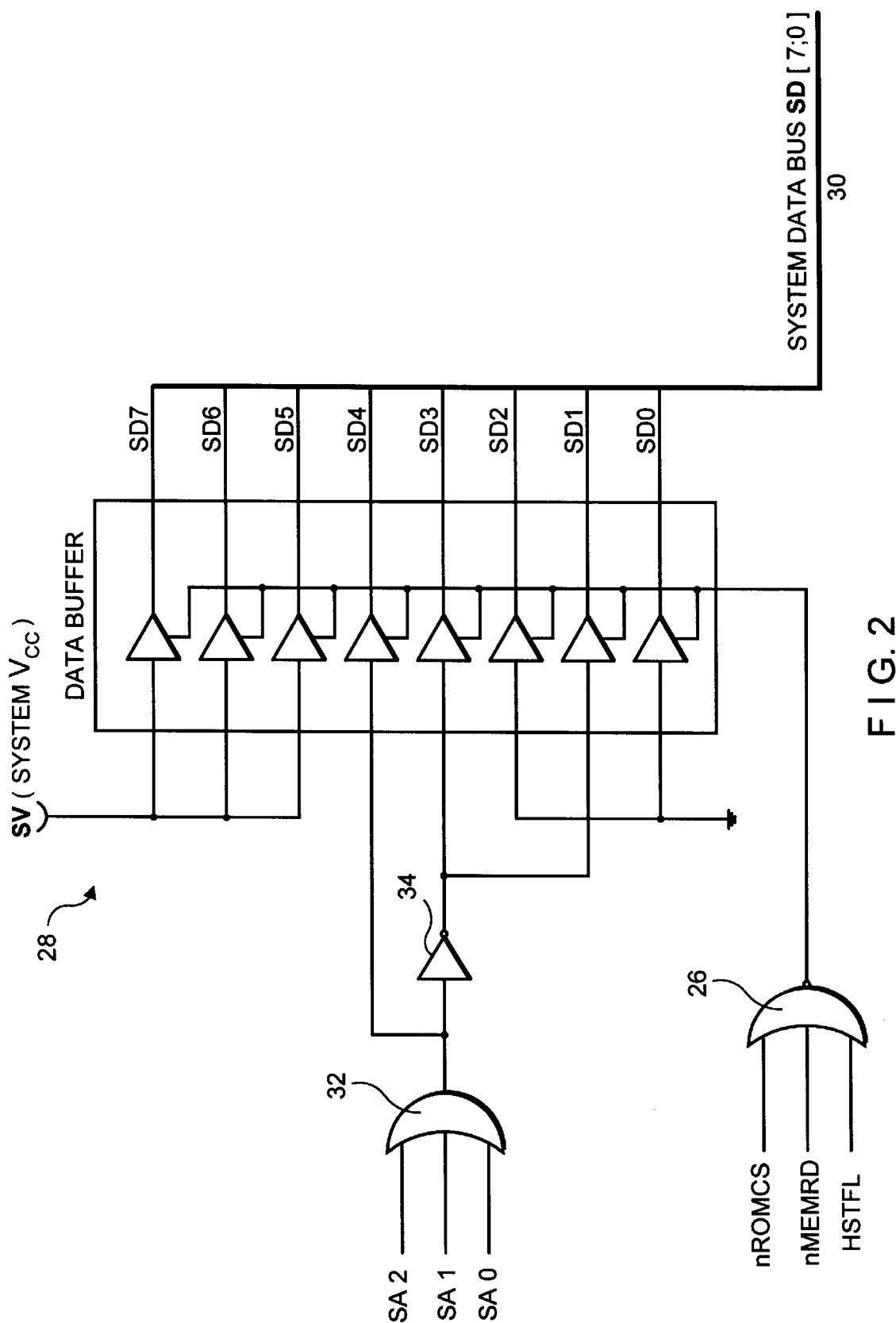
FIG. 2 is a schematic of a more detailed schematic of a logic circuit that may be employed in the shared ROM BIOS interface of the invention.

A logic circuit that can be used to advantage as emulator logic circuit 28 in FIG. 1 is illustrated in FIG. 2. As therein shown, the logic circuit includes an OR gate 32, and a data buffer 35, which, in the embodiment shown includes eight tri-state buffers which produce binary signals SD0-SD7 at their respective outputs. The output of NOR gate 26, also shown in FIG. 1, is applied to the control terminals of each of the tri-state buffers in data buffer 35. The binary output signals of the tri-state buffers are combined onto system data bus 30 as an eight-bit system data bus signal SD[7:0] which resides on the lower 8-bits of the system data bus.

The inputs to OR gate 32 are the least significant bits, SA0, SA1 and SA2 of the System Address SYS_ADDR. The 8-bit value that is output on System Data bus 30 is preferably based on the lower three, or least significant, System Address bits SA[2:0]. For example, when SA[2:0] =[0,0,0], the output of gate 32 is at a binary 0 level, which is applied to the input of buffer SD4. The output of gate 32 is also applied to an input of an inverter 34, the output of which is applied to buffers SD1 and SD3. As also shown in FIG. 1, the inputs to NOR gate 26 are the active low ROM Chip select signal nROMCS, the active low Memory Read signal nMEMRD, derived from the host CPU, and an internal signal HSTROM. The latter signal, as indicated in Table 1, is high or logical one (asserted) when the System Reset signal, nRESET, is deasserted and the embedded keyboard controller is disabled. Under all other combinations of System Reset and keyboard controller status, as also indicated in Table 1, the HSTROM signal is low or binary zero (deasserted), and the BIOS ROM interface is owned or controlled by the keyboard controller.

When nROMCS, nMEMRD, and HSTROM are all equal to binary 0, the output of NOR gate 26 is asserted (binary 1) such that the data buffer to which this signal is applied is transparent. Buffers SD5, SD6, and SD7 are unconditionally at a binary 1 level since they are all tied to the system Vcc, which is typically at 5 volts. Similarly, buffers SD0 and SD2, which are tied to ground, are unconditionally at a binary 0 level. The output of inverter 34 is applied to the inputs of buffers SD1 and SD3.

The bit pattern established at the outputs of buffers SD7-SD0 is an 8-bit signal at the System Data bus 30. When the inputs to OR gate 32 and NOR gate 26 are all binary 0, the 8-bit signal on SD bus 30 has the binary value 11101010. This is the op code EA in hexadecimal form, the instruction in IBM or compatible PCs for the host CPU, x86 Intel type, to perform an absolute jump to the address specified by the next four 8-bit values read over the system data bus SD [7:0] 30. Thereafter, the data driven onto System Data bus 30, for the system addresses SA[2:0]=[0,0,1] through [1,0,0] applied to OR gate 26, causes the 8-bit signal on the System Data bus 30 to be the value F0 in hexidecimal form that corresponds to a jump address that points to the RAM block address in which the shadow BIOS ROM code is stored.

More specifically, the host CPU fetches an op-code value of 0xEA from its initialization vector when the lower three System Address (SA) bits are 0, and fetches data values of 0xF0 on the next four BIOS ROM accesses subsequently attempted by the host CPU. This sequence [0xEA, 0xF0, 0xF0, 0xF0, 0xF0] of op codes is an instruction that causes the host CPU to perform an absolute jump to location 0xFFFF0 in RAM, which corresponds to Block 15 of the memory map in IBM-compatible PCs that normally contains a shadowed copy of the ROM BIOS code. Stated differently, the presence of the op-code 0xEA informs the host CPU that the next two bytes represent the base address in the shadow RAM and that the next two bytes thereafter represent the index address in RAM. The CPU computes, following CPU-RESET or power on, through the use of a mode designated in a standard Intel CPU as the "Real Address mode", the absolute address in RAM by left-shifting the base address by four bits and adding to it the index address to compute the absolute RAM address 0xFFFF0.

Thus, for conditions in which the host CPU 10 seeks access to the shared BIOS ROM when the BIOS ROM 14 is being accessed by the keyboard controller 12, the logic interface circuit 28 of FIG. 2 correctly vectors the host CPU to its initial address in the shadow RAM without requiring access of the host CPU at that time to the shared BIOS ROM.

Figure 3:
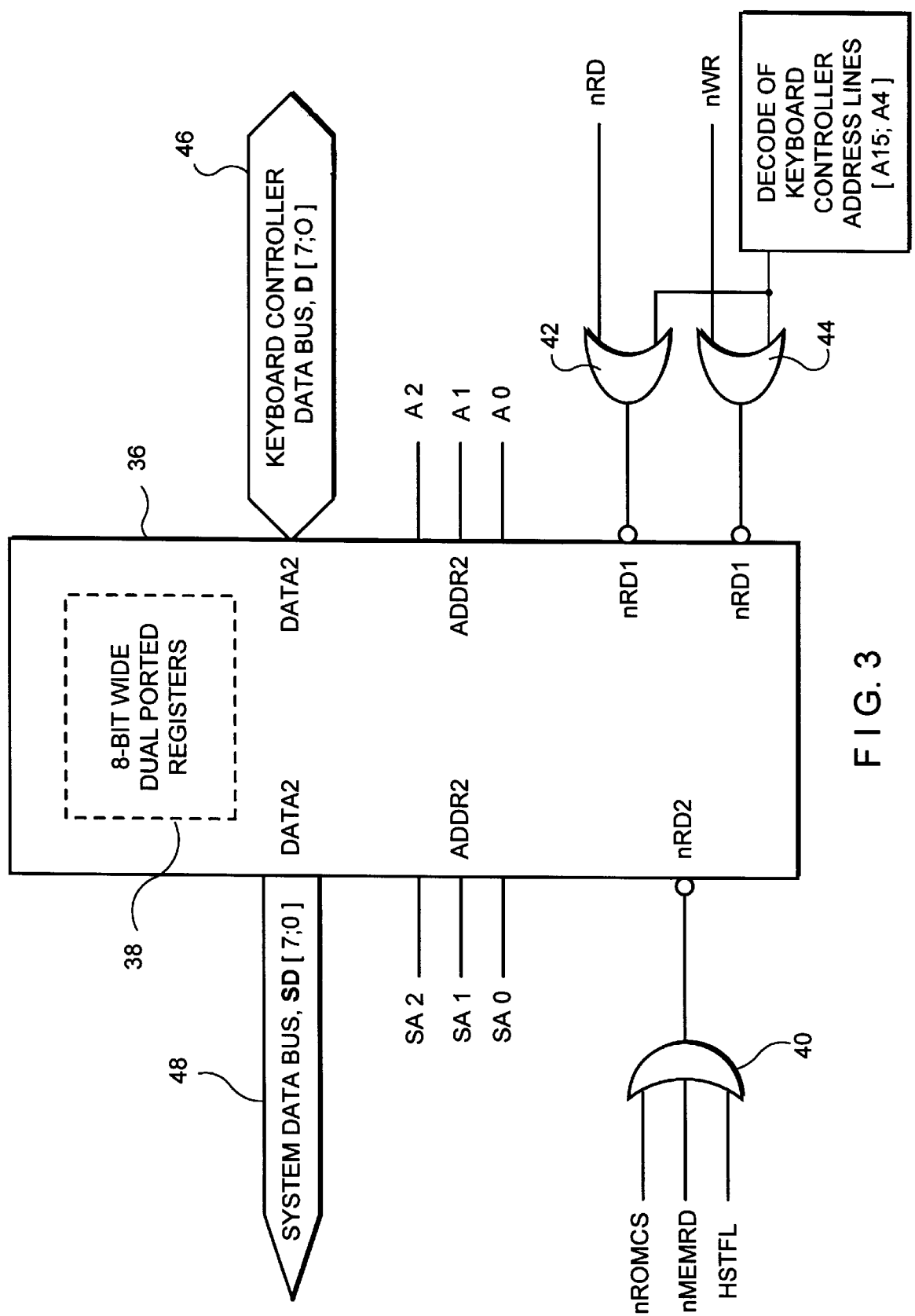
FIG. 3 is a schematic block diagram of an alternative emulator logic circuit for use in the shared BIOS ROM interface of the invention.

FIG. 3 illustrates schematically an alternate logic circuit that may be used to implement the shared BIOS ROM emulator interface of the invention. As therein shown, the data buffer 35 in the interface of the prior embodiment in FIG. 2, is replaced by a dual-ported RAM 36, which, in the FIG. 3 embodiment, includes eight 8-bit-wide dual-ported registers schematically indicated as 38. RAM 36 receives the output of NOR gate 26, which receives as its inputs, the nROMCS signal, the nMEMRD signal, and the HSTROM signal, all of which are previously described herein.

The decoded keyboard controller address lines [A15:A3] is applied to one input of OR gates 42 and 44, the other inputs to which are the active low keyboard controller Read signal nRD and the active low keyboard controller Write signal nWR respectively. The outputs of gates 42 and 44 are applied to the READ and WRITE inputs of RAM 36, which also receives the three least significant system address bits SA0, SA1, and SA2 as well as the three least significant keyboard controller address bits A0, A1 and A2. RAM 36 also sends and receives an 8-bit signal to and from the keyboard controller on a keyboard controller data bus 46 and provides an eight-bit System Data signal on a system data bus 48.

It will be understood from the previous description of the embodiment of FIG. 2, that when HSTROM is zero and the other inputs to gates 26, 42 AND 44 indicate keyboard controller access to the BIOS RAM, the RAM 36 can be programmed to output on the system data bus a sequence of data values that will cause the host CPU to jump to the specified address location in the system memory map to gain access to the BIOS code stored there without interfering with the keyboard controller's ongoing access to the BIOS ROM as desired.

It will thus be appreciated by those skilled in the art that an interface is provided which allows both the system CPU and keyboard controller to share access with a common BIOS ROM in a reliable and relatively simple manner. It will also be appreciated by those having skill in the art that whereas the interface of the invention has been described above with respect to two currently preferred embodiments, variation or modification to those embodiments may be made thereto without necessarily departing from the spirit and scope of the invention.

What is claimed is:

1. An interface for use in a computer that includes a host CPU, a keyboard controller, and a BIOS ROM for providing shared access to the BIOS ROM by the host CPU and keyboard controller, said interface comprising means responsive to the status of the host CPU and keyboard controller for producing a ROM control signal at one of two logic levels, and logic means responsive to the logic level of said ROM control signal to provide exclusive access to the BIOS ROM to one of the host CPU and keyboard controller and for causing the host CPU to access a specified location in the computer system memory that shadows the BIOS ROM code when the keyboard controller and the host CPU simultaneously access said BIOS ROM, whereby said first logic means provides exclusive BIOS ROM access to the keyboard controller.

2. The interface of claim 1, in which said ROM control signal producing means includes additional logic means responsive to the logic status of the system reset signal and keyboard control status.

3. The interface of claim 2, in which the keyboard controller has exclusive access to the BIOS ROM when system reset is asserted.

4. The interface of claim 3, in which the keyboard controller has exclusive access to the stored BIOS ROM when system reset is deasserted and the keyboard controller enable is asserted.

5. The interface of claim 4, in which the host CPU has access to the BIOS ROM when system reset and keyboard controller enable are both deasserted.

* * * * *